United States Patent
Kanamatareddy

(10) Patent No.: US 8,856,187 B2
(45) Date of Patent: Oct. 7, 2014

(54) DATA MANAGEMENT FOR DATA AGGREGATION

(75) Inventor: Ravi K. R. Kanamatareddy, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 1676 days.

(21) Appl. No.: 12/027,284

(22) Filed: Feb. 7, 2008

(65) Prior Publication Data

US 2009/0204565 A1    Aug. 13, 2009

(51) Int. Cl.
*G06F 17/30* (2006.01)

(52) U.S. Cl.
CPC ................. *G06F 17/30592* (2013.01)
USPC .......................... 707/802; 707/796

(58) Field of Classification Search
USPC .................. 707/999.001, 796, 802
See application file for complete search history.

(56) References Cited

U.S. PATENT DOCUMENTS

| | | | |
|---|---|---|---|
| 5,737,591 A | 4/1998 | Kaplan et al. | |
| 6,546,381 B1 | 4/2003 | Subramanian et al. | |
| 6,907,401 B1 * | 6/2005 | Vittal et al. | 705/26 |
| 7,356,572 B2 * | 4/2008 | Jiang et al. | 709/217 |
| 7,391,635 B2 * | 6/2008 | Jackson | 365/52 |
| 7,587,428 B2 * | 9/2009 | Barabas et al. | 1/1 |
| 2002/0107873 A1 | 8/2002 | Winkler et al. | |
| 2002/0124005 A1 | 9/2002 | Matson et al. | |

* cited by examiner

*Primary Examiner* — Monica Pyo
(74) *Attorney, Agent, or Firm* — Hoffman Warnick LLC

(57) ABSTRACT

The invention provides a method, system, and program product for managing data for data aggregation, including data mining and reporting. Locations of a plurality of data to be collected are determined within a source database. Data are simultaneously collected from the plurality of locations and aggregated. The aggregated data are normalized by adding an encryption key and the normalized data are stored. Data at each of the plurality of locations are then released in the source database.

20 Claims, 3 Drawing Sheets

DATA MANAGEMENT FOR DATA AGGREGATION

TECHNICAL FIELD

The invention relates generally to data management and, more particularly, to data management for data aggregation, including data mining and reporting.

BACKGROUND OF THE INVENTION

The use, operation, and maintenance of databases often involves data mining and reporting. These are often incompatible operations. Current data mining methods involve the duplication of a database's contents so that the data can be mined without disabling or otherwise interfering with the use of the production database. However, such methods necessarily employ data that is not current (i.e., because the duplicated database is being mined, changes in the production database will not be reflected until the database is reduplicated). Typically, the "lag" between the duplicated and production databases is between eight and 24 hours, an unacceptably long period in many instances.

Reporting methods suffer from similar deficiencies. For example, in order to ensure that the report reflects the most current and accurate state of the database, some reporting methods query the production database itself. This necessarily interferes with any concurrent use of the production database and may do so for several hours. In addition, in order to avoid having to repeat such queries and their consequent interference with the production database, the report output is typically stored outside the database itself. As a result, report outputs representing multiple states of the production database, none of which may be current, may be available to a user. A further deficiency in such a method is that the report output may be available to individuals who otherwise may not have the permissions necessary to access the production database itself, thus creating a security threat.

Accordingly, there exists a need in the art to overcome the deficiencies and limitations described hereinabove.

SUMMARY OF THE INVENTION

The invention provides a method, system, and program product for managing data for data aggregation, including data mining and reporting.

A first aspect of the invention provides a method of managing data for data aggregation, the method comprising: determining the locations of data to be collected within a source database; acquiring at least one access configuration log of the locations from which data will be collected; simultaneously collecting data from a plurality of the locations; aggregating the collected data; normalizing the aggregated data; storing the normalized data; and releasing the data in the source database.

A second aspect of the invention provides a system for managing data for data aggregation, the system comprising: a system for determining the locations of data to be collected within a source database; a system for acquiring at least one access configuration log of the locations from which data will be collected; a system for simultaneously collecting data from a plurality of the locations; a system for aggregating the collected data; a system for normalizing the aggregated data; a system for storing the normalized data; and a system for releasing the data in the source database.

A third aspect of the invention provides a program product stored on a computer-readable medium, which when executed, manages data for data aggregation, the program product comprising: program code for determining the locations of data to be collected within a source database; program code for acquiring at least one access configuration log of the locations from which data will be collected; program code for simultaneously collecting data from a plurality of the locations; program code for aggregating the collected data; program code for normalizing the aggregated data; program code for storing the normalized data; and program code for releasing the data in the source database.

A fourth aspect of the invention provides a method for deploying an application for managing data for data aggregation, comprising: providing a computer infrastructure being operable to: determine the locations of data to be collected within a source database; acquire at least one access configuration log of the locations from which data will be collected; simultaneously collect data from a plurality of the locations; aggregate the collected data; normalize the aggregated data; store the normalized data; and release the data in the source database.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
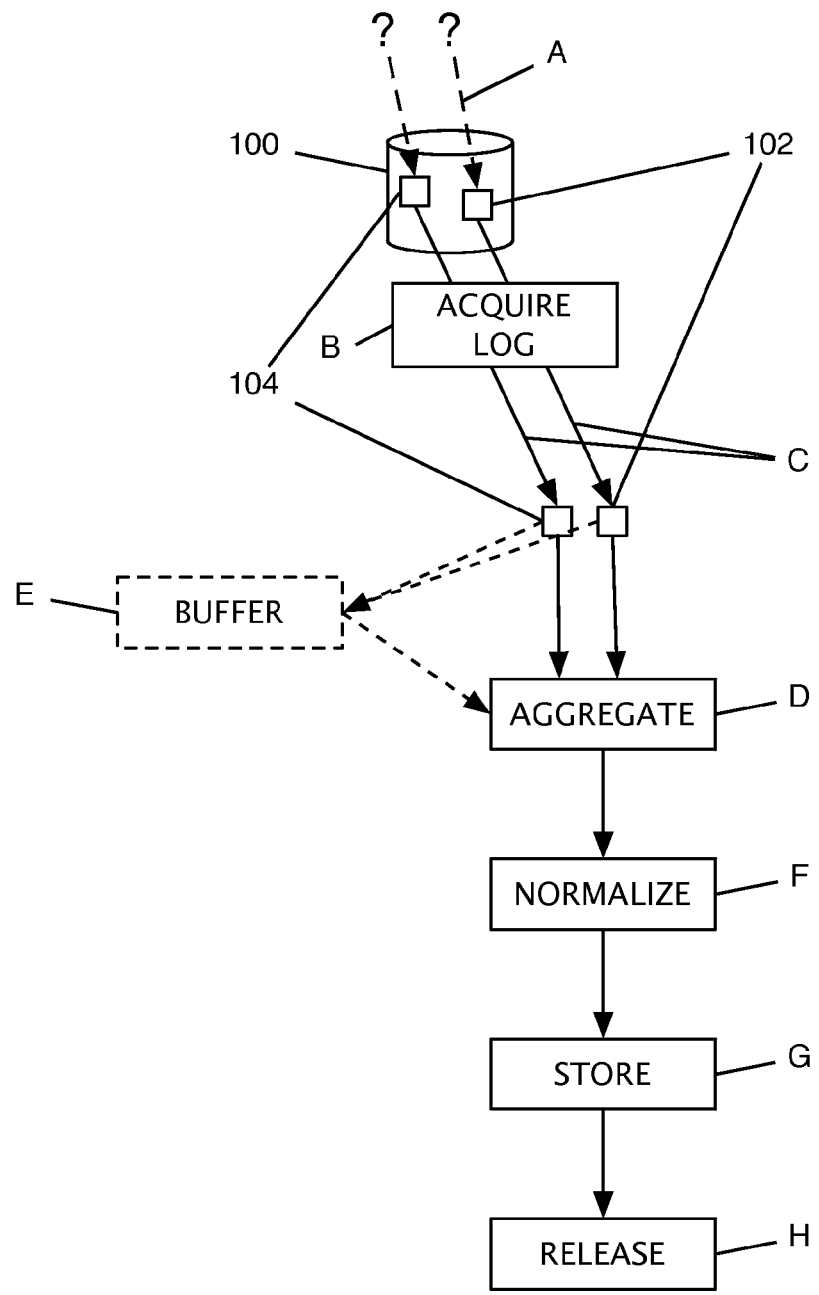
FIG. 1 shows a block and flow diagram of an illustrative method according to an embodiment of the invention.

Referring now to the drawings, FIG. 1 shows a block and flow diagram of an illustrative method according to an embodiment of the invention. At A, the locations of data 102, 104 to be collected from database 100 are determined. At B, an access configuration log is acquired for at least one of the locations determined at A. At C, data 102, 104 are simultaneously collected from a plurality of locations within database 100. Collecting data 102, 104 may optionally include buffering the data at E. Such buffering may be based, for example, on a previous collection, a current collection, and/or an upcoming collection.

At D, data 102, 104 are aggregated. Aggregating may include, for example, an update such as overwriting old data in a previous collection or inserting new data in a previous collection. Aggregating may also include constructing a data stream for the data collected at C, such as a comma separated value (CSV) data stream.

At F, the data aggregated at D are normalized. Normalizing data may include any number of actions, such as compressing the aggregated data, converting the aggregated data to another format, or adding an encryption key to the aggregated data. In short, normalizing may comprise any action or actions for placing the data in a form suitable for subsequent use.

At G, the data normalized at F are stored. Such storage may be within database 100 or on another storage medium. Prior to storing the normalized data, the storage space necessary may be determined in order to ensure that sufficient storage space exists. Finally, at H, the database 100 is released, such that it is made available to other users and/or systems. The method shown in FIG. 1 thus eliminates the duplication of the database 100, as well as its attendant lag in currency.

Figure 2:
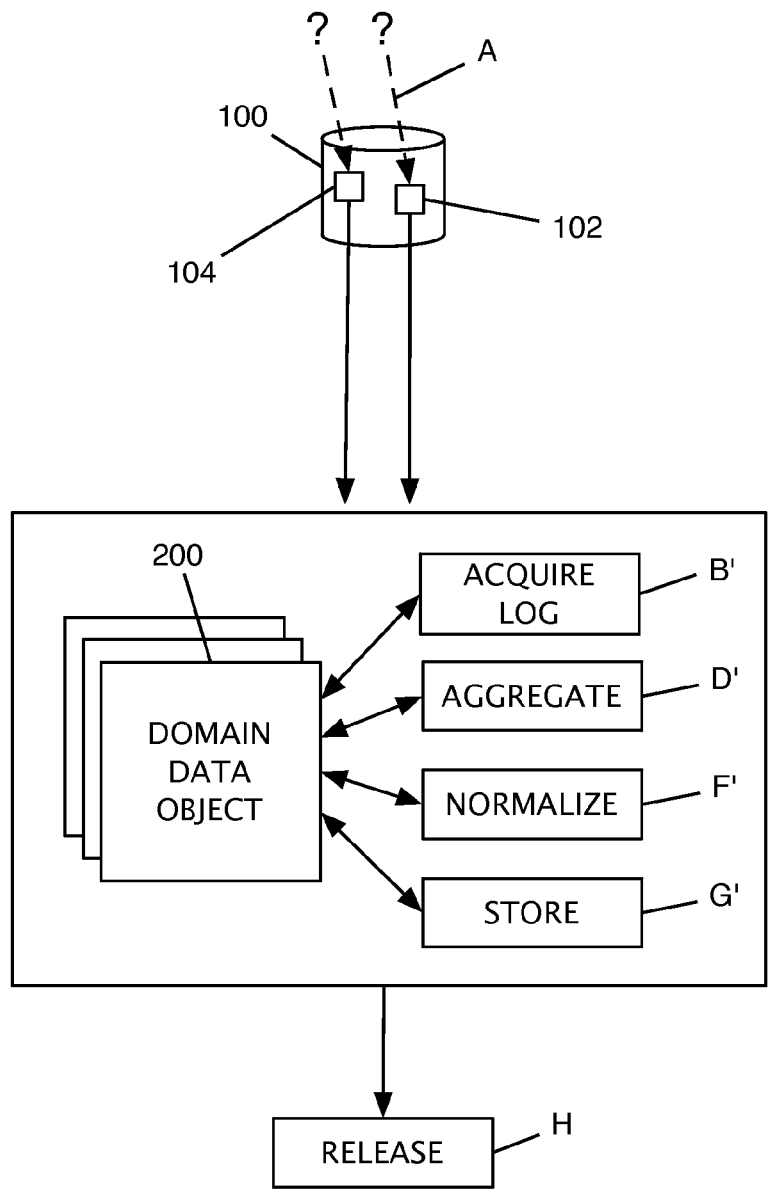
FIG. 2 shows a block and flow diagram of another illustrative method according to an embodiment of the invention.

FIG. 2 shows another block and flow diagram according to an alternative embodiment of the invention. Here, one or more domain data objects 200 are used. Domain data objects 200 are collections of industry-specific rules, procedures, formats, functions, and/or styles that dictate the specifics of how the access configuration log is acquired (B'), and how data is aggregated (D'), normalized (F'), and stored (G').

For example, the type of data to be collected, as well as how it is collected (e.g., in a particular format, utilizing a certain security standard, etc.) may vary depending on the particular industry involved or use to which the data will be put. A banking transaction may require that the data be in a different format than would a retail sales transaction or an electronic communication. Thus, the method of FIG. 2, and particularly the use of one or more domain data objects 200, permits the more standardized collection and aggregation of data based on the ultimate use to which the data will be put. Data may be collected and aggregated differently from the same database if a different domain data object 200 is used.

Figure 3:
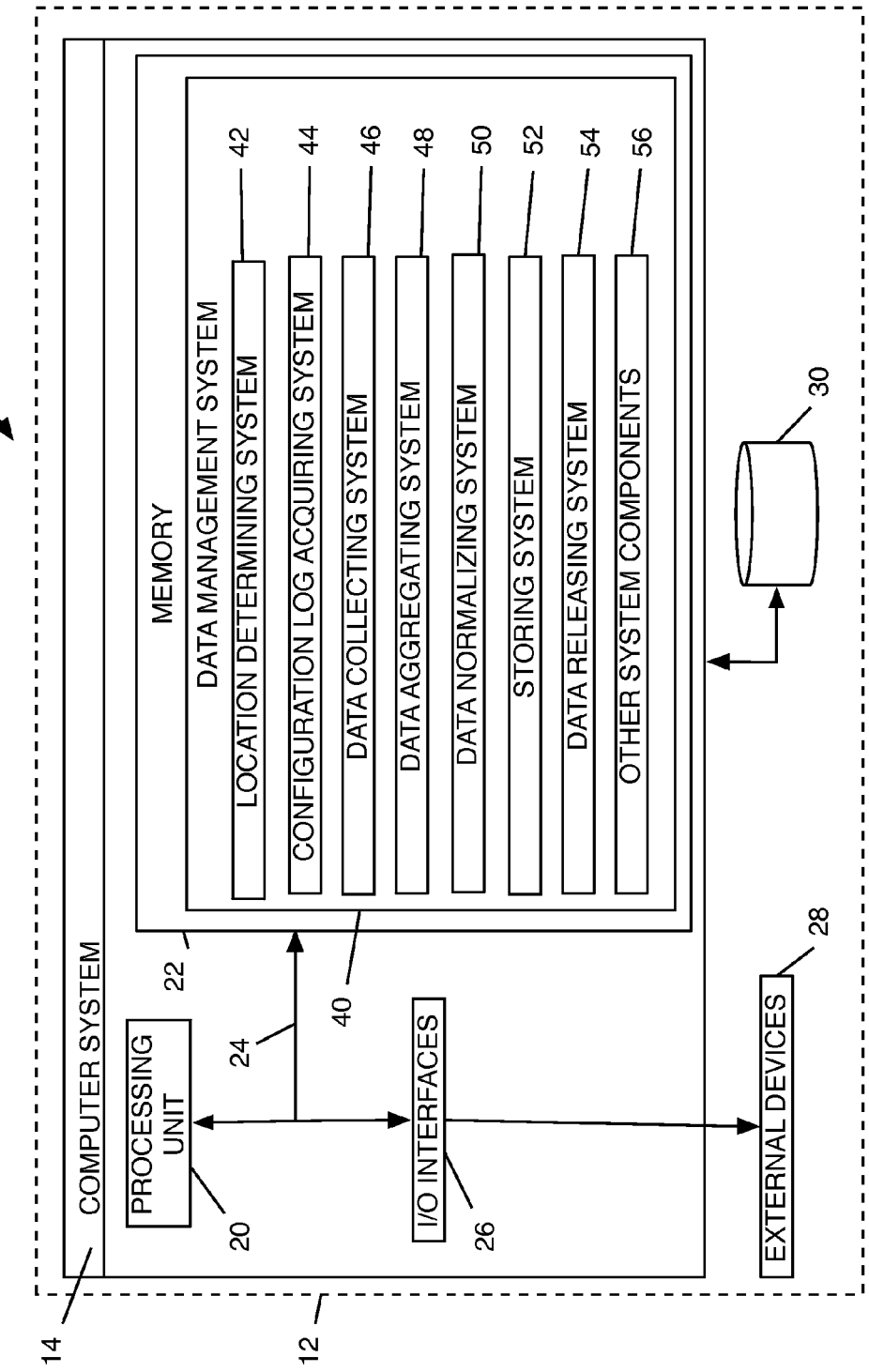
FIG. 3 shows a block diagram of an illustrative system according to an embodiment of the invention.

FIG. 3 shows an illustrative system 10 for managing data for data aggregation. To this extent, system 10 includes a computer infrastructure 12 that can perform the various process steps described herein for managing data for data aggregation. In particular, computer infrastructure 12 is shown including a computer system 14 that comprises a data management system 40, which enables computer system 14 to manage data for data aggregation by performing the process steps of the invention.

Computer system 14 is shown including a processing unit 20, a memory 22, an input/output (I/O) interface 26, and a bus 24. Further, computer system 14 is shown in communication with external devices 28 and a storage system 30. As is known in the art, in general, processing unit 20 executes computer program code, such as data management system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and data management system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, data management system 40 enables computer system 14 to manage data for data aggregation, including data mining and reporting. To this extent, data management system 40 is shown including a location determining system 42, a configuration log acquiring system 44, a data collecting system 46, a data aggregating system 48, a data normalizing system 50, a storing system 52, and a data releasing system. Operation of each of these systems is discussed above. Data management system 40 may further include other system components 56 to provide additional or improved functionality to data management system 40. It is understood that some of the various systems shown in FIG. 3 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for managing data for data aggregation, it is understood that the invention further provides various alternative embodiments. For example, in one embodiment, the invention provides a computer-readable medium that includes computer program code to enable a computer infrastructure to manage data for data aggregation. To this extent, the computer-readable medium includes program code, such as data management system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to manage data for data aggregation, as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for managing data for data aggregation. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing data for data aggregation, the method comprising:
   determining a plurality of locations of data to be collected within a source database;
   acquiring at least one access configuration log of the plurality of locations from which data will be collected;
   simultaneously collecting data from the plurality of the locations;
   aggregating the collected data;
   normalizing the aggregated data, wherein normalizing includes adding an encryption key to the aggregated data;
   storing the normalized data; and
   releasing the data at each of the plurality of locations in the source database.

2. The method of claim 1, wherein simultaneously collecting data includes buffering the collection based on at least one of the following:
   a previous collection;
   a current collection; and
   an upcoming collection.

3. The method of claim 1, wherein aggregating includes constructing a comma separated value (CSV) data stream from the collected data.

4. The method of claim 1, wherein aggregating includes at least one update selected from a group consisting of: overwriting old data in a previous collection and inserting new data in a previous collection.

5. The method of claim 1, wherein normalizing further includes at least one action selected from a group consisting of:
   compressing the aggregated data; and
   converting the aggregated data to another format.

6. The method of claim 1, wherein storing includes determining a size of the normalized data to be stored.

7. A system for managing data for data aggregation, the system comprising:
   at least one computing device;
   a system for determining a plurality of locations of data to be collected within a source database;
   a system for acquiring at least one access configuration log of the plurality of locations from which data will be collected;
   a system for simultaneously collecting data from the plurality of the locations;
   a system for aggregating the collected data;
   a system for normalizing the aggregated data, wherein normalizing includes adding an encryption key to the aggregated data;
   a system for storing the normalized data; and
   a system for releasing the data at each of the plurality of locations in the source database.

8. The system of claim 7, wherein the system for simultaneously collecting data includes a system for buffering the collection based on at least one of the following:
   a previous collection;
   a current collection; and
   an upcoming collection.

9. The system of claim 7, wherein the system for aggregating includes a system for constructing a comma separated value (CSV) data stream from the collected data.

10. The system of claim 7, wherein the system for aggregating is operable to perform at least one of the following actions: overwrite old data in a previous collection and insert new data in a previous collection.

11. The system of claim 7, wherein the system for normalizing is operable to perform at least one of the following actions:
    compress the aggregated data; and
    convert the aggregated data to another format.

12. The system of claim 7, wherein the system for storing includes a system for determining a size of the normalized data to be stored.

13. A program product stored on a computer-readable storage medium, which when executed, manages data for data aggregation, the program product comprising:
    program code for determining a plurality of locations of data to be collected within a source database;
    program code for acquiring at least one access configuration log of the plurality of locations from which data will be collected;
    program code for simultaneously collecting data from the plurality of the locations;
    program code for aggregating the collected data;
    program code for normalizing the aggregated data, wherein normalizing includes adding an encryption key to the aggregated data;
    program code for storing the normalized data; and
    program code for releasing the data at each of the plurality of locations in the source database.

14. The program product of claim 13, wherein the program code for simultaneously collecting data includes program code for buffering the collection based on at least one of the following:
- a previous collection;
- a current collection; and
- an upcoming collection.

15. The program product of claim 13, wherein the program code for aggregating includes program code for constructing a comma separated value (CSV) data stream from the collected data.

16. The program product of claim 13, wherein the program code for aggregating includes program code for at least one of the following: overwriting old date in a previous collection and inserting new data in a previous collection.

17. The program product of claim 13, wherein the program code for normalizing includes program code for at least one of the following:
- compressing the aggregated data; and
- converting the aggregated data to another format.

18. A method for deploying an application for managing data for data aggregation, comprising:
providing a computer infrastructure being operable to:
- determine a plurality of locations of data to be collected within a source database;
- acquire at least one access configuration log of the plurality of locations from which data will be collected;
- simultaneously collect data from the plurality of the locations;
- aggregate the collected data;
- normalize the aggregated data, wherein normalizing includes adding an encryption key to the aggregated data;
- store the normalized data; and
- release the data at each of the plurality of locations in the source database.

19. The method of claim 18, wherein the computer infrastructure is further operable to buffer the collected data based on at least one of the following:
- a previous collection;
- a current collection; and
- an upcoming collection.

20. The method of claim 18, wherein the computer infrastructure is further operable to perform at least one action selected from a group consisting of:
- compressing the aggregated data; and
- converting the aggregated data to another format.

* * * * *